3,356,633
MODIFIED HALOGEN-CONTAINING VINYL
RESIN COMPOSITIONS
Paul R. Graham, Ballwin, Mo., assignor to Monsanto
Company, a corporation of Delaware
No Drawing. Continuation of abandoned application Ser.
No. 195,368, May 21, 1962. This application June 14,
1966, Ser. No. 557,351
29 Claims. (Cl. 260—31.6)

This application is a continuation of pending application Ser. No. 195,368 filed May 21, 1962, now abandoned, which in turn is a continuation-in-part of application Ser. No. 125,951 filed July 24, 1961, now abandoned.

This invention relates to new and useful halogen-containing vinyl resin compositions. In particular this invention relates to new and improved halogen-containing vinyl resin compositions containing modifying agents imparting improved heat distortion, hardness and viscosity properties.

In a particular aspect this invention provides vinyl halide compositions which have been plasticized with fumarate ester compositions and which have improved physical properties.

Resinous compositions comprising halogen-containing vinyl halide resins and fumarate ester compositions generally possess properties which limit their use in important fields of application. Vinyl halide-fumarate ester composition plastisols are characterized by a high initial viscosity. In addition, such a fused and cured resinous composition possesses an undesirably low heat distortion temperature property.

It is an object of this invention to provide improved halogen-containing vinyl resin compositions.

It is a further object of this invention to provide halogen-containing vinyl resin compositions which have improved heat distortion, hardness and viscosity stability characteristics.

A still further object of this invention is an additive formulation which, when incorporated in halogen-containing vinyl resins, produces the aforesaid improved compositions.

Other objects and advantages of the invention will be apparent from the following detailed description thereof.

In accordance with this invention, it has been found that the above and still further objects are achieved by incorporating a halogen-containing vinyl resin and a polmerizable plasticizer. Such a plasticizer comprises a fumarate ester composition and a polyallyl ester of a polybasic acid. Said plasticizer may also include an aryl alkane.

Generally speaking from about 5 to about 200 parts by weight of plasticizer can be used per 100 parts by weight of resin. Each 100 parts by weight of said plasticizer can be comprised of from about 50 to about 95 parts by weight of the fumarate ester composition and from about 5 to about 50 parts by weight of the polyallyl ester wherein the ratio of the fumarate ester composition to the polyallyl ester is at least 1:1. However, in preferred formulations, the polymerizable plasticizer is used in amounts of from about 25 to about 100 parts by weight per 100 parts by weight of resin. In such preferred formulations, each 100 parts by weight of the plasticizer comprises from about 60 to about 95 parts by weight of the fumarate ester composition and from about 5 to about 40 parts by weight of the polyallyl ester wherein the ratio of the fumarate ester composition to the polyallyl ester is at least 3:2.

These compositions are found to have improved heat distortion temperatures, increased hardness and excellent viscosity stability. Further, the composition still possess good tensile properties and low volatility properties which are usually not obtainable in the plastisols containing conventional plasticizers.

The compositions of this invention may be worked up in the usual manner, e.g. by extrusion, injection molding, molding, rolling, rotational casting, etc. into shaped articles which possess hard and rigid properties. In addition to the usual methods of fabrication, the compositions may be used in spray type applications to coat articles with a hard and rigid material.

In order to facilitate the curing of the polymerizable plasticizer in the resin dispersion within a practicable time, it is preferred to incorporate from about 0.5% to about 5% of a polymerization catalyst, based on the weight of the plasticizer. While any of the usual peroxy polymerization catalysts such as t-butyl perbenzoate, benzoyl peroxide, acetyl peroxide, di-t-butyl peroxide and chlorine substituted aryl peroxides are effective, it is preferred to use t-butyl perbenzoate or di-t-butyl peroxide.

The usual heat stabilizers and light stabilizers for the resin may also be in the dispersion as indicated in the examples below. Fillers and coloring materials well known to those familiar with the art may also be added to the resin if desired.

The halogen-containing resins of this invention are those derived from such vinyl compounds as vinyl chloride, vinylidene chloride, vinyl chloroacetate, chlorostyrene, chlorobutadienes, etc. Said resins also include the copolymers of such vinyl compounds and other ethylenically unsaturated monomers copolymerizable therewith. Illustrative are the copolymers of a vinyl halide such as vinyl chloride with other monomers such as vinylidene chloride, vinyl esters of carboxylic acids, e.g. vinyl acetate, vinyl propionate, vinyl butyrate, vinyl benzoate; esters of unsaturated acids, e.g. alkyl acrylates such as methyl acrylate, ethyl acrylate, propyl acrylate, butyl acrylate, allyl acrylate, and the corresponding esters of methacrylic acid; vinyl aromatic compounds, e.g. styrene orthochlorostyrene, para-chlorostyrene, 2,5-dichlorostyrene, 2,4-dichlorostyrene, para-ethyl styrene, vinyl naphthalene, α-methyl styrene; dienes such as butadiene, chlorobutadiene, unsaturated amides such as acrylic acid amide, acrylic acid anilide; unsaturated nitriles, such as acrylic acid nitriles; esters of α,β-unsaturated carboxylic acids, e.g. the methyl, ethyl, propyl, butyl, amyl, hexyl, heptyl, octyl, allyl, methallyl and phenyl esters of maleic, crotonic, itaconic, and fumaric acids and the like. It should be recognized that the halogenated resins containing halogens other than chlorine, e.g. bromine, fluorine and iodine, are also operable in this invention. Said halogenated resins may contain a varying proportion of halogen depending upon the nature of the resin and its contemplated use. Those copolymers in which a predominant portion, i.e., more than 50% by weight of the copolymer is made from a halogen-containing vinylidene monomer such as vinyl chloride represents a preferred class of polymers to be treated according to this invention.

When used for the preparation of plastisols, the above halogen-containing vinyl resins are of the dispersion type and the preparation of such dispersion type vinyl resins are well known in the art. They are usually prepared by a conventional aqueous emulsion polymerization which produces a latex-like dispersion of the halogen-containing resin. The polymeric material is recovered from the latex-like dispersion by a coagulation of flocculation process as a fine powder wherein usually 95% of the particles are within ±0.05 micron of the mean particle size. Halogen-containing dispersion type resins having a wide range of average particles size, as for example, from about 0.05 to about 200 microns, may be employed in practicing this invention. However, the use of powdery halogen-containing resins having an average particle size of from 0.05 to about 30 microns is preferred. Powdery dispersion type resins having a particle size less than 0.05 micron tend to dissolve too readily in the plasticizer and cause the plastisol to gel. Powdery dispersion resins having an average particle size greater than about 30 microns may tend to form grainy plastisols.

The polymerizable plasticizers of this invention are not only compatible with the various vinyl resins of the type herein described but are also compatible with the known non-polymerizable ester plasticizers commonly employed with such resins. Illustrative of these latter plasticizers are the aryl and alkyl phosphates, the alkyl phthalates, adipates, sebacates, azelates, and epoxidized vegetable oils. Specifically, there can be mentioned tri(2-ethylhexyl) phosphate, tricresyl phosphate, di-(2-ethylhexyl)phthalate and the corresponding adipate, dioctyl sebacate, and epoxidized soya bean oils. Excellent plastisols have been made by intimately mixing a vinyl resin such as a polyvinyl chloride with up to 33% or more of a mixture of plasticizers, based upon the weight of the plastisol, of which one of the plasticizers is a polymerizable plasticizer composition of this invention and is present in an amount equal to at least about 65% of the total plasticizer.

The fumarate ester compositions which are useful as polymerizable plasticizers with this invention comprise a mixture of a plurality of components. A common feature of such components is the fumaryl group. In general, the components of the fumarate ester compositions comprise (1) alkylene glycol monoalkyl fumarate of the formula $R_1-O-A-O-R-O-H$, (2) dialkyl fumarate of the formula $R_1-O-A-O-R_2$, (3) alkylene glycol bis(alkyl fumarate) of the formula

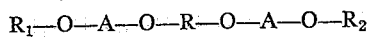

and (4) alkylene glycol bis(alkyl fumarate) oligomer of the formula

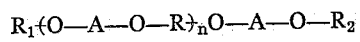

where A is the fumaryl radical

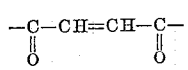

R is a radical selected from the group consisting of aliphatic and alicyclic hydrocarbon and oxyhydrocarbon radicals;
$R_1$ and $R_2$ are selected from the group consisting of alkyl, cycloalkyl, alkenyl and aralkyl radicals; and
$n$ is a number from about 1.7 to 2, based on molecular weight determination.

The aforedescribed fumarate ester compositions are prepared by any one of the following methods:

METHOD I

A partical ester of maleic acid, represented by the structure

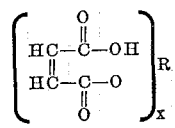

where R is selected from aliphatic and alicyclic hydrocarbon radicals and $x$ is a whole number from 2 to 6, is heated with at least one hydroxy compound of the structure $R_1OH$, where $R_1$ is selected from alkyl, cycloalkyl, alkenyl and aralkyl radicals in the presence of a halogen-containing compound to esterify and isomerize the maleic partial ester in a single, simple step. It is preferred to carry out the reaction at a temperature of from about 120 to about 150° C.

The fumarate ester compositions prepared by Method I comprise (1) from about 5 to 20% of alkylene glycol monoalkyl fumarate of the formula $$R_1-O-A-O-R-O-H$$

(2) from about 35 to 50% of dialkyl fumarate of the formula $R_1-O-A-O-R_2$, (3) from about 1 to 50% of alkylene glycol bis(alkyl fumarate) and (4) from about 5 to 50% of the alkylene glycol bis(alkyl fumarate) oligomer of the formula

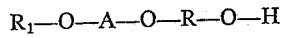

wherein A, R, $R_1$, $R_2$ and $n$ have the aforedescribed significance.

METHOD II

A fumarate ester represented by the formula

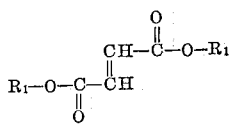

where $R_1$ is selected from alkyl, cycloalkyl, alkenyl and aralkyl radicals is reacted with a polyhydroxy compound having from 2 to 6 hydroxyl groups, wherein the moles of fumarate ester in the reaction is equal to the number of hydroxyl groups on the polyhydroxy compound. It is preferred to carry out the reaction at a temperature of from about 120 to about 160° C.

The fumarate ester compositions prepared by Method II comprise (1) from about 5 to 10% of alkylene glycol monoalkyl fumarate of the formula $$R_1-O-A-O-R-O-H$$

(2) from about 30 to 35% of dialkyl fumarate of the formula $R_1-O-A-O-R_2$, (3) from about 1 to 2% of alkylene glycol bis(alkyl fumarate) and (4) from about 58 to 63% of alkylene glycol bis(alkyl fumarate) oligomer of the formula

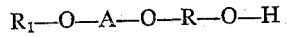

wherein A, R, $R_1$, $R_2$ and $n$ have the aforedescribed significance.

METHOD III

A fumarate ester heretofore described in Method II is reacted with a polyhydroxy compound having 2 to 6 hydroxyl groups, wherein one and one-half moles of fumarate ester is used in the reaction for each hydroxyl group on the polyhydroxy compound. It is preferred to carry out the reaction at a temperature of from about 120 to about 180° C.

The fumarate ester compositions prepared by Method III comprise (1) about 2% dialkyl fumarate of the formula $R_1-O-A-O-R_2$, (2) from about 93 to 95% of alkylene glycol bis(alkyl fumarate) of the formula $R_1-O-A-O-R-O-A-O-R_2$ and (3) about 5% alkylene glycol bis(alkyl fumarate) oligomer of the formula

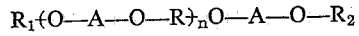

wherein A, R, $R_1$, $R_2$ and $n$ have the aforedescribed significance.

METHOD IV

A fumaryl chloride of the formula

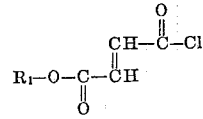

where $R_1$ is selected from alkyl, cycloalkyl, alkenyl and aralkyl radicals is reacted with a polyhydroxy compound having from 2 to 6 hydroxyl groups, the molar ratio of chloride to polyhydroxy compound being $x:1$ where $x$ equals the number of said hydroxyl groups. It is preferred to carry out the reaction at a temperature of from about 50 to about 120° C.

The fumarate ester compositions prepared by Method IV comprise (1) about 2% dialkyl fumarate of the formula $R_1$—O—A—O—$R_2$ and (2) about 98% alkylene glycol bis(alkyl fumarate) of the formula $$R_1\text{—O—A—O—R—O—A—O—}R_2$$

wherein A, R, $R_1$ and $R_2$ have the aforedescribed significance.

As will be readily apparent, R represents a divalent radical in the illustrations given above. It should be recognized that where R is a higher polyvalent radical (from tri- to hexavalent) the several components of the fumarate ester compositions are of analogous nature. However, it should be noted that the presence of additional free valences on R produce structures of greater complexity. In such applications wherein fumarate ester compositions are desired where R is a trivalent radical or higher, it is preferred that said fumarate ester compositions be prepared by reacting a fumaryl chloride with a polyhydroxy compound having 3 to 6 hydroxyl groups (see Method IV).

The aliphatic polyhydroxy compounds suitable for use in preparing the polymerizable fumarate esters of this invention include alkylene glycols, as for example, ethylene glycol, 1,2-propanediol, 1,3-propanediol,, 2-methyl-2-ethyl-1,3-propanediol, 1,2-butanediol, 1,3-butanediol, 1,4-butanediol, 2-butene-1,4-diol, 2,3-butanediol, 2,2-dimethylpropane-1,3-diol, 1,4-pentanediol, 1,5-pentanediol, 1,6-hexanediol, 1,10-decanediol, 1,12-octadecanediol, 9,10-octadecanediol and the like; polyalkylene glycols, such as diethylene glycol, triethylene glycol, tetraethylene glycol, dipropylene glycol, tripropylene glycol and the like; triols such as glycerol, amylglycerol, diethylglycerol, 1,2,3-tributylglycerol, 1,2,6-hexanetriol, 1,3,5-hexanetriol and the like; other polyhydroxy compounds such as those which can be produced by condensation of formaldehyde with various ketones and aldehydes, as Formaldehyde with:
   Acetaldehyde_____ pentaerythritol
   Propionaldehyde_____ trimethylolethane
   Butyraldehyde_____ trimethylolpropane
   Valeraldehyde_____ trimethylolbutane
   Acetone_____ 1,1,1-trimethylolisopropanol
   Methylethyl ketone___ 2,2-dimethylolbutanol-3 as well as compounds such as erythritol, xylitol, sorbitol, diglycerol, 2-hydroxymethyl-2-methylpropanediol-1,3 anhydroenneaheptitol, and the substituted glycols, such as halogenated glycols, e.g. 3-chloro-1,2-propanediol, 2-chloro-1,3-propanediol, 2-chloro-1,3-butanediol, or nitro substituted glycols, e.g. 2-nitro-1,3-propanediol, 2-nitro-1,3-butanediol, 2-nitro-2-methylpropanediol-1,3, trimethylol nitromethane, 2-nitro-1,4-butanediol, and the like.

Further examples of suitable aliphatic polyhydroxy compounds are the alicyclic polyols such as 1,2-cyclohexanediol, 1,3-cyclohexanediol, 1,4-cyclohexanediol, 1,4-cyclohexanedimethylol, 1,3,5 - cyclohexanetrimethylol, 1,3,5-cyclohexanetriol, 1,3-cyclopentanediol, pentahydroxycyclohexane, hexahydroxycyclohexane, and the various bis(hydroxycyclohexyl)alkanes such as 2,2-bis(4-hydroxycyclohexyl)propane.

The alcohols, $R_1$OH, which are employed in preparing the polymerizable fumarate esters for use in this invention include methanol, ethanol, n-propanol, isopropanol, 1-butanol, 2-butanol, isobutanol, n-pentanol, isopentanol, n-hexanol, isohexanol, 4-methylpentanol-2, 2-ethylbutanol-1, n-heptanol, 2-ethylhexanol, 1-octanol, 2-octanol, isooctanol, isononanol, n-decanol, isodecanol, n-dodecanol, tridecanol, tetradecanol, pentadecanol, octadecanol, carbitol, methyl carbitol, allyl alcohol, methallyl alcohol, crotyl alcohol, benzyl alcohol, phenylethyl alcohol, cyclopentanol, cyclohexanol, cyclooctanol, methylcyclohexanol, ethylcyclohexanol, dimethylcyclohexanol, cyclohexylmeth- anol, cyclohexylethanol, propylcyclohexanol, isopropylcyclohexanol, butylcyclohexanol, hexylcyclohexanol, octylcyclohexanol, nonylcyclohexanol, dodecylcyclohexanol and the like.

The exemplary alcohols, listed above, may be obtained from natural or synthetic sources. Thus, for example, the alcohols can be produced by the Oxo synthesis or can be derived from the Fischer-Tropsch process, the Synol process or the Oxyl process. Such alcohols can also be produced by the hydration of olefins or the oxidation of petroleum fractions or by the catalytic hydrogenation of coconut oil.

The following detailed examples will more fully illustrate the preparation of the fumarate ester compositions which are useful as polymerizable plasticizers with this invention.

Example 1

Into a suitable reaction vessel (having agitation means, means for measuring the temperature of liquids and vapors, heating and cooling means, and means for condensing vapors) there was charged 270.1 grams (3.0 moles) of 1,3-butanediol and 590.2 grams (6.0 moles) of maleic anhydride and the resulting mixture was heated to about 120° C.–150° C. for several minutes, cooled and held at 120° C.–125° C. for one-half hour to yield 1,3-butylene glycol, bis (acid maleate). 489.7 grams (6.6 moles) of butanol, 2.2 grams of concentrated sulfuric acid and 21.4 grams of concentrated hydrochloric acid were then added and the resulting mixture was maintained warm enough to cause continuous refluxing of butanol for about five hours ( this required temperatures of about 135° C.–140° C. and a slight vacuum towards the end of the reaction). Water formed by the esterification was removed via the butanol-water azeotrope and was separated before butanol was returned to the reaction vessel.

Thereafter hydrogen chloride and excess butanol were removed by stripping under vacuum and a temperature of about 140° C. Sulfuric acid and any partial ester present were removed by washing the reaction mass with aqueous sodium carbonate, a basic filter aid material such as Microcel C, a synthetic calcium silicate produced by a hydrothermal reaction of diatomaceous earth with a source of calcium, was added and the reaction mass was steamed for about 30 minutes at 100° C. and 100 mm. of mercury to remove residual butanol. The reaction product was then dried at 100° C. and 20–30 mm. of mercury for about 30 minutes and filtered (a filter aid can be used) to yield 1208.0 grams of a liquid fumarate ester composition have an index of refraction at 25° C. of 1.6818, a specific gravity at 25°/25° C. of 1.0608 and a color of 200 APHA.

Example 2

In the manner of Example 1, 376.8 grams (3.0 moles) of dipropylene glycol, 592.2 grams (6.0 moles) of maleic anhydride and 541.0 grams (7.3 moles) of butanol were utilized to prepare 1135.9 grams of a liquid fumarate ester composition having a specific gravity at 25°/25° C. of 1.0626 and an index of refraction at 25° C. at 1.4600.

Example 3

To a suitable reaction vessel there was charged 294.7 grams (3.0 moles) of maleic anhydride and 134.7 grams (1.0 mole) of 1,2,6-hexanetriol, and the resulting mixture was heated to about 200° C. for several minutes, cooled and held at 140°–145° C. for several hours. 296.7 grams (4.0 moles) of butanol, 1.8 grams of concentrated sulfuric acid and 10.7 grams of concentrated hydrochloric acid were then added to the reaction mass and the resulting mixture was maintained for about 1½ hours, warm enough to cause continuous refluxing of butanol. Water formed by the esterification was removed by the butanol-water azeotrope and was separated before butanol was returned to the reaction vessel.

Thereafter, hydrogen chloride and excess butanol were removed by stripping under vacuum. Sulfuric acid and any partial ester present were removed by washing the reaction mass with hot aqueous sodium carbonate after which the reaction mass was steamed for about three hours at 110°–115° C. and 100 mm. of mercury. The reaction product obtained from the above was then dried to yield 578.3 grams of a liquid fumarate ester composition having an index of refraction, $n_d^{25}$, of 1.4688 and a specific gravity at 25°/25° C. of 1.0836.

*Examples 4–18*

In a manner similar to the procedure of Example 1, other compositions of esters of fumaric acid can be prepared as tabulated below:

| Example No. | Polyhydroxy Compound | Alcohol |
|---|---|---|
| 4 | Diethylene glycol | Butanol. |
| 5 | 1,3-butanediol | 2-ethylhexanol. |
| 6 | do | Methanol. |
| 7 | do | Isopentanol. |
| 8 | do | Isohexanol. |
| 9 | do | Isooctanol. |
| 10 | 1,4-propanediol | 2-ethylhexanol. |
| 11 | Ethylene glycol | Do. |
| 12 | Triethylene glycol | Propen-1-ol-3. |
| 13 | do | Propen-3-ol-3 and butanol. |
| 14 | Neopentyl glycol | Butanol. |
| 15 | 1,3-butanediol | Carbitol. |
| 16 | do | Butanol and allyl alcohol. |
| 17 | do | Cyclohexanol. |
| 18 | Pentaerythritol | Butanol. |

*Example 19*

A suitable reactor is charged with 6870 grams (24.0 moles) diisohexyl fumarate, 1081 grams (12.0 moles) 1,3-butanediol and 34 grams calcium hydroxide. The mixture is heated at a reduced pressure of 10 to 50 mm. Hg. Isohexanol is distilled off until the reaction mixture attains a temperature of about 140° C. Approximately 8 hours is required for the isohexanol removal. The reaction mixture is maintained at 140° C. under reduced pressure for an additional hour and then cooled to 90° C. The catalyst is removed from the reaction mixture by filtration. The filtrate is steamed for about an hour at 100° C. and 100 mm. Hg to remove residual isohexanol. The batch is washed several times with aqueous sodium carbonate and water, steam sparged under vacuum and dried. The yield of fumarate ester composition is 6818 grams (94.4% of theory).

*Examples 20–44*

Following the procedure of Example 19 other fumarate ester compositions can be prepared from the reactants as summarized below:

| Example No. | Dialkyl Fumarate | Polyhydroxy Compound |
|---|---|---|
| 20 | Isohexyl | 1,2-butanediol. |
| 21 | Butyl | 1,3-butanediol. |
| 22 | Isobutyl | Do. |
| 23 | Methylamyl | Do. |
| 24 | 2-ethylhexyl | Do. |
| 25 | Isooctyl | Do. |
| 26 | Benzyl | Do. |
| 27 | Isohexyl | 1,4-butanediol. |
| 28 | Isohexyl | Neopentyl. |
| 29 | 2-ethylhexyl | Do. |
| 30 | Butyl | Dipropylene Glycol. |
| 31 | Isobutyl | Do. |
| 32 | Isohexyl | Do. |
| 33 | 2-ethylhexyl | Do. |
| 34 | Butyl | Diethylene Glycol. |
| 35 | Isobutyl | Do. |
| 36 | Isohexyl | Do. |
| 37 | 2-ethylhexyl | Do. |
| 38 | Butyl | Triethylene Glycol. |
| 39 | Isobutyl | Do. |
| 40 | Isohexyl | Do. |
| 41 | Methylamyl | Do. |
| 42 | 2-ethylhexyl | Do. |
| 43 | Isooctyl | Do. |
| 44 | Butyl | 1,2,6-hexanetriol. |

*Example 45*

A suitable reactor is charged with 1575.7 grams (6.9 moles) dibutyl fumarate and 7.8 grams calcium hydroxide and heated to about 140° C. under a reduced pressure of about 10–12 mm. Hg 207.0 grams (2.3 moles) of 1,3-butanediol is added slowly over a period of about 4 hours while the reaction temperature is maintained at 140° C. Upon completion of the addition of the glycol, the reaction mixture is held at 140° C. for an adidtional 1 hour to remove excess butanol. The reaction mixture is then cooled to 75° C. and filtered to remove the catalyst. The filtrate is steam sparged for about 1 hour at 100° C. and 100 mm. Hg, then washed several times with aqueous sodium carbonate and water, and dried under vacuum. The dry mixture is distilled at 80° C. and 10µ to remove excess dibutyl fumarate. There is obtained 701 grams (99.2% of theory) of fumarate ester composition.

*Examples 46–51*

Following the procedure of Example 45 other fumarate ester compositions can be prepared from the reactants tabulated below:

| Example No. | Dialkyl Fumarate | Polyhydroxy Compound |
|---|---|---|
| 46 | Isobutyl | 1,3-butanediol. |
| 47 | Isohexyl | Do. |
| 48 | 2-ethylhexyl | Do. |
| 49 | Cyclohexyl | Do. |
| 50 | Butyl | Triethylene Glycol. |
| 51 | do | 1,2,6-hexanetriol. |

*Example 52*

A suitable reactor is charged with 212.7 grams (1.12 moles) of butyl fumaryl chloride and heated to 75° C. 50.3 grams (0.56 mole) of 1,3-butanediol is added slowly to the butyl fumaryl chloride under reduced pressure of 55 mm. Hg over a period of about ½ hour. During the 1,3-butanediol addition, the temperature of the reaction mixture is maintained at 75°–77° C. Upon completion of the addition of the 1,3-butanediol, the reaction mixture is held at 75° C. for about 1½ hours. The reaction mixture is washed several times with aqueous sodium carbonate and water, steam sparged under vacuum and dehydrated. There is obtained 192.1 grams (86.5% of theory) of fumarate ester compositions, $n_d^{25}$, 1.4650, and having a specific gravity of 1.0786 at 25°/25° C.

*Examples 53–65*

In a manner similar to the procedure of Example 52 other fumarate ester compositions can be prepared from the reactants listed in the following table:

| Example No. | Alkyl Fumaryl Chloride | Polyhydroxy Compound |
|---|---|---|
| 53 | Isobutyl | 1,3-butanoediol. |
| 54 | Isohyexyl | Do. |
| 55 | 2-ethylhexyl | Do. |
| 56 | Isodecyl | Do. |
| 57 | Butyl | Dipropylene Glycol. |
| 58 | Isohexyl | Do. |
| 59 | 2-ethylhexyl | Do. |
| 60 | Butyl | Triethylene Glycol. |
| 61 | Isohexyl | Do. |
| 62 | 2-ethylhexyl | Do. |
| 63 | Butyl | 1,2,6-hexanetriol. |
| 64 | Isohexyl | Do. |
| 65 | Butyl | Pentaerythritol. |

The polyallyl esters which are suitable for use in this invention are those esters of any allyl alcohol (substituted or unsubstituted) with a polybasic acid (saturated or unsaturated).

Examples of such esters are diallyl carbonate, diallyl malonate, diallyl oxalate, diallyl succinate, diallyl glutarate, diallyl adipate, diallyl gluconate, dialyl methyl gluconate, diallyl azelate, diallyl sebacate, diallyl maleate, diallyl ortho phthalate, diallyl isophthalate, diallyl terephthalate, diallyl itaconate, diallyl fumarate, diallyl tartronate, diallyl tartrate, diallyl silicate, diallyl dimerate, diallyl mesaconate, diallyl citraconate, diallyl chlorophthalate, and the like; triallyl tricarballylate, triallyl aconitate, triallyl citrate, triallyl phosphate, triallyl silicate, triallyl cyanurate, tetraallyl silicate and other tetraallyl esters; and the corresponding dimethallyl esters such as dimethallyl carbonate, dimethallyl oxalate, dimethallyl malonate, dimethallyl succinate, dimethallyl suberate, dimethallyl azelate, dimethallyl sebacate, dimethallyl maleate, dimethallyl phthalate and the like.

While the allyl esters of saturated polybasic acids are preferred, it may be desirable to use allyl esters of unsaturated polybasic acids in some cases, particularly in admixture with the polyallyl esters of saturated polybasic acids.

It has been found that the heat distortion temperature of a vinyl halide-fumarate ester composition can be substantially raised by incorporating in the resin composition an amount of a polyallyl ester of a polybasic acid, as heretofore described, to provide from about 5 to about 100 parts by weight of ester per 100 parts by weight of vinyl resin.

The following examples illustrate the effect of a polyallyl ester as a heat distortion temperature modifier for a vinyl halide-fumarate ester composition resin.

In addition to the improved heat distortion temperature obtained by addition of a polyallyl modifying agent, unexpected improvements in plastisol viscosity, and also improvements in hardness, volatility, and tensile strength of the fused and cured resins, are noted.

As illustrative of the improvements obtained with this invention but not limitative thereof are the following:

Plastisol compositions are prepared by stirring together in the weight proportions set forth below in Table III a dispersion type halogen-containing resin, a fumarate ester composition, and a polyallyl ester of a polybasic acid.

The viscosity of each composition listed in Table III was tested on the Brookfield Model HAT viscometer using the No. 6 spindle at 50 r.p.m. The results of such testing, in poises, was determined after several different time intervals, and such results are hereinafter disclosed in Table IV.

To further illustrate the unique properties imparted by the polyallyl esters of this invention, the resinous compositions set forth in Table III were pressure molded for 8 minutes at 325° F. The fused and cured resins are characterized by the physical properties listed below in Table V.

TABLE I

| Composition | Parts by Weight |||||||||||||| 
|---|---|---|---|---|---|---|---|---|---|---|---|---|---|---|
| | I | II | III | IV | V | VI | VII | VIII | IX | X | XI | XII | XIII | XIV |
| Polyvinyl Chloride | 100 | 100 | 100 | 100 | 100 | 100 | 100 | 100 | 100 | 100 | 100 | 100 | 100 | 100 |
| Fumarate Ester Composition Prepared in Example 1 | 50 | 45 | 42.5 | 40 | 35 | 30 | 45 | 42.5 | 40 | 35 | 30 | | | |
| Fumarate Ester Composition Prepared in Example 19 | | | | | | | | | | | | 40 | | |
| Fumarate Ester Composition Prepared in Example 45 | | | | | | | | | | | | | 40 | |
| Fumarate Ester Composition Prepared in Example 52 | | | | | | | | | | | | | | 40 |
| Diallyl Adipate | | 5 | 7.5 | 10 | 15 | 20 | | | | | | | | |
| Diallyl Phthalate | | | | | | | 5 | 7.5 | 10 | 15 | 20 | 20 | 20 | 40 |
| Dibasic Lead Phosphite | 3 | 3 | 3 | 3 | 3 | 3 | 3 | 3 | 3 | 3 | 3 | 3 | 3 | 3 |
| t-Butyl Perbenzoate | 0.5 | 0.5 | 0.5 | 0.5 | 0.5 | 0.5 | 0.5 | 0.5 | 0.5 | 0.5 | 0.5 | | | |
| Di-t-butyl Peroxide | | | | | | | | | | | | 0.6 | 0.6 | 0.6 |

TABLE II

| Composition | I | II | III | IV | V | VI | VII | VIII | IX | X | XI | XII | XIII | XIV |
|---|---|---|---|---|---|---|---|---|---|---|---|---|---|---|
| Heat Distortion Temperature, °C | 40 | 45 | 51 | 54 | 55 | 54 | 48 | 52 | 57 | 60 | 65 | 67 | 61 | 48 |

TABLE III

| Composition | Parts by Weight |||||||||||||
|---|---|---|---|---|---|---|---|---|---|---|---|---|---|
| | XV | XVI | XVII | XVIII | XIX | XX | XXI | XXII | XXIII | XXIV | XXV | XXVI | XXVII |
| Polyvinyl Chloride | 100 | 100 | 100 | 100 | 100 | 100 | 100 | 100 | 100 | 100 | 100 | 100 | 100 |
| Fumarate Ester Composition Prepared in Example 1 | 42.5 | 42.5 | 42.5 | 42.5 | 42.5 | 42.5 | 42.5 | 42.5 | 42.5 | 50 | | | |
| Fumarate Ester Composition Prepared in Example 19 | | | | | | | | | | | 40 | | |
| Fumarate Ester Composition Prepared in Example 45 | | | | | | | | | | | | 40 | |
| Fumarate Ester Composition Prepared in Example 52 | | | | | | | | | | | | | |
| Diallyl Adipate | 7.5 | | | | | | | | | | | | 40 |
| Diallyl Succinate | | 7.5 | | | | | | | | | 20 | 20 | 20 |
| Diallyl Sebacate | | | 75. | | | | | | | | | | |
| Diallyl Oxalate | | | | 7.5 | | | | | | | | | |
| Diallyl Phthalate | | | | | 7.5 | | | | | | | | |
| Diallyl Malonate | | | | | | 7.5 | | | | | | | |
| Diallyl Dimerate | | | | | | | 7.5 | | | | | | |
| Diallyl Diglycolate | | | | | | | | 7.5 | | | | | |
| Triallyl Citrate | | | | | | | | | 7.5 | | | | |
| Dibasic Lead Phosphite | 3 | 3 | 3 | 3 | 3 | 3 | 3 | 3 | 3 | 3 | 3 | 3 | 3 |
| t-Butyl Perbenzoate | 0.5 | 0.5 | 0.5 | 0.5 | 0.5 | 0.5 | 0.5 | 0.5 | 0.5 | | | | |
| Di-t-butyl Peroxide | | | | | | | | | | | 0.6 | 0.6 | 0.6 |

TABLE IV

| Composition | XV | XVI | XVII | XVIII | XIX | XX | XXI | XXII | XXIII | XXIV | XXV | XXVI | XXVII |
|---|---|---|---|---|---|---|---|---|---|---|---|---|---|
| 4 Hours at 23° C | 79 | 113 | 170 | 174 | 144 | 90 | 146 | 76 | 122 | 152 | 54.4 | 29.6 | 52.4 |
| 1 Day at 23° C | 94 | 110 | 210 | 236 | 170 | | | | 132 | 228 | 84 | 44.4 | |
| 7 Days at 23° C | 108 | 146 | 211 | 304 | 212 | | | | 168 | 375 | | | |
| 30 Days at 23° C | 154 | 192 | 257 | 374 | 246 | | | | 200 | 534 | | | |

TABLE V

| Composition | XV | XVI | XVII | XVIII | XIX | XX | XXI | XXII | XXIII | XXIV | XXV | XXVI | XXVII |
|---|---|---|---|---|---|---|---|---|---|---|---|---|---|
| Volatility, Percent Wt. Loss | 1.00 | 1.25 | 1.24 | 1.17 | 2.05 | 1.76 | 3.71 | 1.80 | 1.01 | 3.37 | 0.18 | 0.67 | 0.59 |
| Hardness Shore "D" | 75 | 77 | 76 | 74 | 77 | 75 | 53 | 73 | 80 | 56 | 81 | 78 | 80 |
| Tensile Strength, p.s.i. | 3,800 | 4,100 | 4,170 | 3,570 | 6,154 | 4,060 | 5,410 | 3,720 | 5,580 | 2,970 | 6,505 | 5,120 | 4,690 |
| Elongation, Percent | 35 | 115 | 65 | 15 | 10 | 60 | 115 | 135 | 7 | 120 | 90 | 105 | 125 |

At room temperature the molded compositions XV, XVI, XVII, XVIII, XIX, XX XXII, XXIII, XXV, XXVI and XXVII are hard and rigid. Composition XXI is hard and semi-rigid. All of said compositions are characterized by a tack-free surface.

It is apparent that for optimum use in molding, plastisols must have an element of fluidity in order that they can be poured, sucked, or pumped into molds or in order that they will flow around articles to be coated. Usually when freshly prepared, the viscous liquid plastisols are sufficiently fluid so that they can be employed to fill molds, or can be employed in dip molding processes, injection molding, extrusion molding, rotational casting and spraying operations. However, the viscosity of such liquid plastisols increases appreciably in but a few days after their preparation, as was demonstrated in Table IV. This increase in viscosity means that the plastisol can no longer be sucked or poured into molds, or that a greatly increased power input is required to pump the more viscous material into said molds.

Since molding with a plastisol is intended to provide an inexpensive, rapid method for molding hard rigid articles and to provide a method for producing an uniformly tailored, hard protective coating at low cost, it is extremely important that the viscosity of the plastisol be maintained within reasonably usable values even after the plastisol is seven to fourteen days old. When the viscosity of the plastisol increases beyond the usuable limit, it is apparent that the user thereof will suffer a loss or be put to the additional expense of restoring the plastisol to a usable material. Thus, it is readily apparent that a plastisol which does not change appreciably in viscosity, even after being stored for as long as two weeks, is an exceedingly useful composition.

It has also been found that the viscosities heretofore tabulated can be further improved by the addition of another component. Specifically it has been found that such further improved viscosity is obtained by incorporating with the vinyl resin-fumarate ester composition-polyallyl ester plastisol, up to about 60 parts of a substantially non-volatile, alkyl substituted monoaryl compound per 100 parts of vinyl resin.

In general from about 5 to about 200 parts fumarate ester composition-polyallyl ester-aryl alkane plasticizer can be used per 100 parts by weight of resin. Each 100 parts by weight of said plasticizer can be comprised of from about 50 to about 90 parts by weight of the fumarate ester composition, from about 5 to about 50 parts by weight of the polyallyl ester, from about 5 to about 30 parts by weight of aryl alkane and wherein the ratio of fumarate ester composition to aryl alkane is at least 3:2. In preferred formulations, the polymerizable plasticizer is used in amounts of from about 25 to about 100 parts by weight per 100 arts by weight of resin. In such preferred formulations each 100 parts by weight of plasticizer comprises from about 55 to about 90 parts by weight of the fumarate ester composition, from about 5 to about 30 parts by weight of polyallyl ester, from about 5 to about 15 parts by weight of the aryl alkane and wherein the ratio of the fumarate ester composition to aryl alkane is at least 3:1.

The alkyl substituted monoaryl compounds or aryl alkanes of this invention will, in general, have a boiling point in excess of about 200° C. A preferred aryl alkane of this invention is that obtained by condensing an aromatic hydrocarbon of the benzene series with a branched chain alkylating agent such as a branched chain olefin (or mixture of alkyl halides) containing about 8 to 18 carbon atoms. A particularly useful and economical aryl alkane of this invention is keryl benzene, prepared by mono-alkylating benzene with the product obtained by substantial monochlorination of paraffin base kerosene fractions. Such paraffin base kerosene fractions are obtained from Pennsylvania base oil and are often termed paraffin base kerosenes. In general such kerosene fractions distill between 150° C. and 300° C., but preferably in the range of 190° C. to 250° C., and contain 10 to 16 carbon atoms to the molecule and usually average 12 carbon atoms per molecule. Another illustrative, particularly preferred aryl alkane of this invention is that obtained by condensing an aromatic hydrocarbon of the benzene series with an acyclic propylene polymer containing 9 to 18 carbon atoms, but preferably 12 to 18 carbon atoms. The major component of these propylene polymers is of the general structure

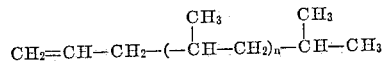

where $n$ is an integer from 1 to 4 inclusive.

The propylene polymers, upon condensing with an aromatic hydrocarbon such as benzene or like members of the benzene series, provide a mixture of mono-alkylated products of which the major component may be represented by the following structural formula

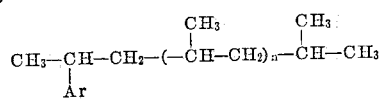

where Ar represents an aromatic nucleus derived from a member of the benzene series such as phenyl, tolyl, and xylyl, and where $n$ is an integer of 1 to 4. The preparation of such aryl alkanes is well known and is ordinarily carried out at relatively low temperatures in the presence of an alkylation catalyst.

Many types of catalysts have found use in the alkylation reaction including the better known Friedel-Crafts catalysts, for example, aluminum chloride, aluminum bromide and ferric chloride, zinc, tin, and titanium chlorides, boron halides, sulfuric acid, hydrofluoric acid and phosphoric acid. Also frequently used are solid absorbent catalysts comprising oxides of the metals of Group III–B or IV–A of the periodic table in combination with silica oxide. Still other catalysts often used are metal pyrophosphates.

The examples set forth below illustrate the effect of an aryl alkane as a viscosity improver in the aforedescribed plastisol compositions.

Plastisol compositions are prepared by stirring together, in the weight proportions set forth in Table VI, a dispersion type halogen-containing resin, a fumarate ester composition, a polyallyl ester of a polybasic acid and an aryl alkane.

The viscosity of each of the compositions listed in Table VI was tested at 23° C. on a Brookfield Model HAT viscometer using a No. 6 spindle at 50 r.p.m. The results of such testing, in poises, is hereinafter recorded in Table VII.

Upon fusing and curing the compositions of Table VI for 8 minutes at 325° F., products characterized by the physical properties listed in Table VIII were obtained.

TABLE VII

| Composition No. | Viscosity | | | | |
|---|---|---|---|---|---|
| | Initial | 1 Day | 7 Days | 14 Days | 21 Days |
| A | 152 | 228 | 375 | 440 | 485 |
| B | 79 | 94 | 108 | 127 | 138 |
| C | 56 | 66 | 79 | 87 | 93 |
| D | 40 | 104 | 42.4 | 78 | 111.6 |
| E | 30.8 | 107.6 | | | |
| F | 23.6 | 27.6 | | | |
| G | | | | | |
| H | 18 | 20.8 | 48 | 89.6 | 120 |
| I | 60.8 | 40.8 | 53.6 | 101.3 | 132.4 |
| J | 60.8 | 40 | 37.2 | 53.6 | 74.4 |
| K | 15.2 | 20.8 | | | |
| L | 21.6 | 26.4 | 44.8 | 65 | 97.2 |
| M | 25.6 | 50.4 | | | |
| N | 51.2 | 42.4 | 74.8 | 132.4 | 184.4 |
| O | 30.4 | 46 | 59.2 | 86 | 112.8 |
| P | 26 | 37.6 | 52.4 | 67.2 | 96.8 |
| Q | 35.6 | 67.6 | 112 | 144 | 174.4 |
| R | 21.6 | 41.6 | | | |
| S | 37.2 | 46.8 | 76.4 | | |
| T | 71.6 | 88.4 | | | |
| U | 22 | 33.6 | | | |
| V | 21.6 | 40.8 | | | |
| W | 22.4 | 28 | 73.6 | 89.6 | 108 |

TABLE VI

| Composition | Parts by Weight | | | | | | | | | | | |
|---|---|---|---|---|---|---|---|---|---|---|---|---|
| | A | B | C | D | E | F | G | H | I | J | K | L |
| Polyvinyl Chloride | 100 | 100 | 100 | 100 | 100 | 100 | 100 | 100 | 100 | 100 | 100 | 100 |
| Fumarate Ester Composition Prepared in Example 1 | 50 | 42.5 | 37.5 | | | | | | | | | |
| Fumarate Ester Composition Prepared in Example 19 | | | | 36 | | | | | | | | |
| Fumarate Ester Composition Prepared in Example 21 | | | | | 36 | | | | | | | |
| Fumarate Ester Composition Prepared in Example 24 | | | | | | 36 | | | | | | |
| Fumarate Ester Composition Prepared in Example 26 | | | | | | | 36 | | | | | |
| Fumarate Ester Composition Prepared in Example 27 | | | | | | | | 36 | | | | |
| Fumarate Ester Composition Prepared in Example 28 | | | | | | | | | 36 | | | |
| Fumarate Ester Composition Prepared in Example 29 | | | | | | | | | | 36 | | |
| Fumarate Ester Composition Prepared in Example 30 | | | | | | | | | | | 36 | |
| Fumarate Ester Composition Prepared in Example 32 | | | | | | | | | | | | 36 |
| Diallyl Adipate | | | | | | | | | | | | |
| Monophenyl Dodecane [1] | | 7.5 | 7.5 | 18 | 18 | 18 | 18 | 18 | 18 | 18 | 18 | 18 |
| Dibasic Lead Phosphite | | | 5 | 6 | 6 | 6 | 6 | 6 | 6 | 6 | 6 | 6 |
| Di-t-butyl Peroxide | 3 | 3 | 3 | 3 | 3 | 3 | 3 | 3 | 3 | 3 | 3 | 3 |
| t-Butyl Perbenzoate | 0.5 | 0.5 | 0.5 | 0.6 | 0.6 | 0.6 | 0.6 | 0.6 | 0.6 | 0.6 | 0.6 | 0.6 |

| Composition | Parts by Weight | | | | | | | | | | |
|---|---|---|---|---|---|---|---|---|---|---|---|
| | M | N | O | P | Q | R | S | T | U | V | W |
| Polyvinyl chloride | 100 | 100 | 100 | 100 | 100 | 100 | 100 | 100 | 100 | 100 | 100 |
| Fumarate Ester Composition Prepared in Example 34 | 36 | | | | | | | | | | |
| Fumarate Ester Composition Prepared in Example 36 | | 36 | | | | | | | | | |
| Fumarate Ester Composition Prepared in Example 40 | | | 36 | | | | | | | | |
| Fumarate Ester Composition Prepared in Example 42 | | | | 36 | | | | | | | |
| Fumarate Ester Composition Prepared in Example 45 | | | | | 36 | | | | | | |
| Fumarate Ester Composition Prepared in Example 46 | | | | | | 36 | | | | | |
| Fumarate Ester Composition Prepared in Example 47 | | | | | | | 36 | | | | |
| Fumarate Ester Composition Prepared in Example 50 | | | | | | | | 36 | | | |
| Fumarate Ester Composition Prepared in Example 52 | | | | | | | | | 36 | | |
| Fumarate Ester Composition Prepared in Example 54 | | | | | | | | | | 36 | |
| Fumarate Ester Composition Prepared in Example 55 | | | | | | | | | | | |
| Diallyl Adipate | | | | | | | | | | | 36 |
| Monophenyl Dodecane [1] | 18 | 18 | 18 | 18 | 18 | 18 | 18 | 18 | 18 | 18 | 18 |
| Dibasic Lead Phosphite | 6 | 6 | 6 | 6 | 6 | 6 | 6 | 6 | 6 | 6 | 6 |
| Di-t-butyl Peroxide | 3 | 3 | 3 | 3 | 3 | 3 | 3 | 3 | 3 | 3 | 3 |
| t-Butyl Perbenzoate | 0.6 | 0.6 | 0.6 | 0.6 | 0.6 | 0.6 | 0.6 | 0.6 | 0.6 | 0.6 | 0.6 |

[1] Obtained by mono-alkylating benzene with a commercial propylene tetramer (B.P. 340–420° F.) in the presence of anhydrous hydrofluoric acid at room temperature. Analysis indicates that the dodecyl substituent is principally:

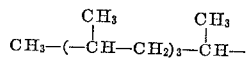

TABLE VIII

| Composition No. | Hardness Shore "D" | Volatility | Tensile Strength, p.s.i. | Elongation, percent | Toughness, lbs./in.² |
|---|---|---|---|---|---|
| A | 56 | -------- | 2,970 | 120 | -------- |
| B | 75 | -------- | 3,800 | 35 | -------- |
| C | 74 | -------- | 4,250 | 110 | -------- |
| D | 74 | 1.43 | 4,850 | 140 | 2,765 |
| E | 77 | 0.65 | 5,500 | 125 | 2,110 |
| F | 72 | 2.08 | 3,820 | 105 | 1,535 |
| G | 70 | 2.57 | 4,140 | 290 | 4,380 |
| H | 65 | 2.93 | 4,330 | 235 | 3,210 |
| I | 73 | 1.14 | 5,215 | 150 | 2,775 |
| J | 65 | 2.65 | 4,200 | 135 | 2,605 |
| K | 69 | 1.47 | 4,280 | 165 | 2,575 |
| L | 72 | -------- | 4,130 | 140 | 2,200 |
| M | 68 | 2.72 | 4,685 | 265 | 4,150 |
| N | 69 | 2.48 | 4,490 | 195 | 3,120 |
| O | 71 | 1.67 | 4,420 | 160 | 2,655 |
| P | 73 | 2.25 | 4,230 | 150 | 2,240 |
| Q | 80 | 0.53 | 5,730 | 130 | 3,155 |
| R | 80 | 0.40 | 5,170 | 125 | 2,650 |
| S | 80 | 0.58 | 5,130 | 100 | 1,990 |
| T | 79 | 0.72 | 5,040 | 140 | 2,730 |
| U | 74 | 0.56 | 5,465 | 100 | 2,445 |
| V | 71 | 1.88 | 4,045 | 115 | 1,785 |
| W | 73 | 1.87 | 3,980 | 95 | 1,530 |

As the data in Tables VII and VIII indicate, the compositions of this invention are characterized by excellent viscosity stability with slight improvement in tensile strength and essentially no reduction in hardness. Excellent mold release is obtained with compositions C through W.

The following test methods were used in determining the physical properties listed in Tables II, V, and VII:

| | A.S.T.M. |
|---|---|
| Heat distortion | 1043–51 |
| Volatility | D–1203 |
| Tensile properties | D–882–56T |
| Hardness | D–676–58T |

Toughness is defined as the area under the stress-strain curve obtained in test procedure A.S.T.M. D–882–56T.

The substantially non-volatile, alkyl substituted mono-aryl compound has been described with respect to certain embodiments, namely the aryl alkanes obtained by condensing benzene with a mono-chloride of a paraffin base kerosene fraction or preferably by condensing benzene with a propylene polymer containing 9 to 18 carbon atoms. Both condensations provide a monophenyl branched chain alkane containing a carbon atom content in the range of 14 to 27 carbon atoms and characterized by a carbon atom chain length attached to a ring carbon atom of the aryl nucleus of 6 to 12 carbon atoms. However, it is to be understood that the invention is not so limited. The class of aryl aklanes operable in the instant invention are those of the structure

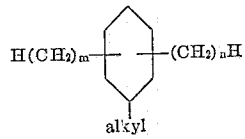

wherein $m$ and $n$ are integers from 0 to 1, and preferably 0, and where the alkyl substituent is branched or straight chain and contains 8 to 18 carbon atoms, said alkyl substituent being characterized by a carbon atom chain length attached to a ring carbon atom of the aryl nucleus of at least 6 and not more than 15. As illustrative of such aryl alkanes are 1-phenyl-3,6-dimethyl hexane, 1-phenyl-4,6-dimethyl heptane, 2-phenyl-4,6-dimethyl heptane, 2-phenyl-4,6,8-trimethyl nonane, 2-phenyl-4,6-dimethyl nonane, isodecyl benzene, 1-phenyl-4,6,8-trimethyl decane, 2-phenyl-4,6-dimethyl decane, 2-phenyl-4,6,8,10-tetramethyl undecane, 1-phenyl-4,6,8,10-tetramethyl undecane, n-dodecyl benzene, isododecyl benzene, 1-phenyl-4,6,8-trimethyl dodecane, 2-phenyl-4,6,8,10,12-pentamethyl tridecane, n-tetradecyl benzene, isotetradecyl benzene, 2-phenyl-4,6,8,10-tetramethyl-tetradecane, 1-phenyl-4,6,8,10-tetramethyl tetradecane, 1-phenyl-4,6,8-trimethyl pentadecane, 2-phenyl-4,6,8-trimethyl pentadecane, and the like, and mixtures thereof.

The high boiling residues obtained when benzene, toluene and xylene are used as starting materials in the aforedescribed alkylation reaction are also embraced within the broader aspects of this invention.

Further examples of compositions of this invention are shown in Table IX.

TABLE IX

| Composition | Parts by Weight | | | | | | | | | | | | | |
|---|---|---|---|---|---|---|---|---|---|---|---|---|---|---|
| | AA | BB | CC | DD | EE | FF | GG | HH | II | JJ | KK | LL | MM | NN |
| Polyvinyl Chloride | 100 | 100 | 100 | 100 | 100 | 100 | 100 | 100 | 100 | 100 | 100 | 100 | 100 | 100 |
| Fumarate Ester Composition Prepared in Example 8 | 36 | ---- | ---- | ---- | ---- | ---- | 40 | ---- | ---- | ---- | ---- | ---- | 36 | ---- |
| Fumarate Ester Composition Prepared in Example 15 | ---- | 36 | ---- | ---- | ---- | ---- | ---- | 36 | ---- | ---- | ---- | ---- | ---- | 36 |
| Fumarate Ester Composition Prepared in Example 48 | ---- | ---- | 36 | ---- | ---- | 36 | ---- | ---- | ---- | ---- | 40 | ---- | 36 | ---- |
| Fumarate Ester Composition Prepared in Example 57 | ---- | ---- | ---- | 36 | ---- | ---- | ---- | ---- | ---- | 40 | ---- | ---- | ---- | ---- |
| Fumarate Ester Composition Prepared in Example 63 | ---- | ---- | ---- | ---- | 36 | ---- | ---- | 14 | ---- | ---- | ---- | 18 | ---- | ---- |
| Diallyl Adipate | 18 | ---- | ---- | ---- | ---- | ---- | 18 | ---- | ---- | ---- | 14 | ---- | ---- | 18 |
| Diallyl Phthalate | ---- | 18 | ---- | ---- | ---- | ---- | ---- | 18 | ---- | ---- | ---- | ---- | ---- | ---- |
| Diallyl Succinate | ---- | ---- | 18 | ---- | 18 | ---- | ---- | ---- | 14 | ---- | 14 | ---- | 18 | ---- |
| Diallyl Sebacate | ---- | ---- | ---- | 18 | ---- | ---- | ---- | ---- | ---- | 14 | ---- | ---- | ---- | ---- |
| Diallyl Oxalate | ---- | ---- | ---- | ---- | ---- | ---- | 6 | ---- | 6 | ---- | ---- | ---- | ---- | ---- |
| Keryl Benzene [1] | 6 | ---- | ---- | ---- | 6 | ---- | ---- | ---- | ---- | ---- | 6 | ---- | 6 | 6 |
| Monophenyl Nonane [2] | ---- | 6 | ---- | ---- | ---- | 6 | ---- | ---- | ---- | 6 | ---- | ---- | ---- | ---- |
| Monophenyl Pentadecane [3] | ---- | ---- | 6 | ---- | ---- | ---- | ---- | 6 | ---- | ---- | ---- | 6 | ---- | ---- |
| Monophenyl Octadecane [4] | ---- | ---- | ---- | 6 | ---- | ---- | ---- | ---- | ---- | ---- | ---- | ---- | ---- | ---- |
| Dibasic Lead Phosphite | 3 | 3 | 3 | 3 | 3 | 3 | 3 | 3 | 3 | 3 | 3 | 3 | 3 | 3 |
| Di-t-Butyl Peroxide | 0.6 | 0.6 | 0.6 | 0.6 | 0.6 | 0.6 | 0.6 | 0.6 | 0.6 | 0.6 | 0.6 | 0.6 | 0.6 | 0.6 |

[1] Obtained by condensing, in substantially equimolecular proportions, benzene and kerosene chloride obtained by introducing chlorine into a kerosene fraction until said fraction is substantially one-third to two-thirds chlorinated on a molar basis, said kerosene fractions boiling between 190° C. and 250° C. and consisting essentially of paraffinic hydrocarbons averaging 12 carbon atoms per molecule.

[2] Obtained by mono-alkylating benzene with a commercial propylene trimer (B.P. 107–144° C.) in the presence of BF₃ at room temperature. Analysis indicates that the nonyl substituent is principally

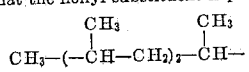

[3] Obtained by mono-alkylating benzene with a commercial propylene pentamer (B.P. 420–510° F.) in the presence of anhydrous hydrofluoric acid at room temperature. Analysis indicates that the pentadecyl substituent is principally.

$$CH_3-(-CH(CH_3)-CH_2)_4-CH-$$

[4] Obtained by mono-alkylating benzene with a propylene hexamer in the presence of boron trifluoride at room temperature. Analysis indicates the octadecyl substituent is principally

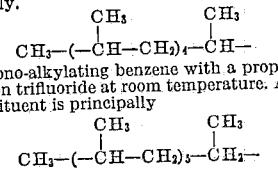

The plastisol compositions AA through NN possess viscosity characteristics similar to those of compositions C through W. Such compositions, upon fusion and curing, have excellent physical properties with respect to hardness, volatility tensile strength, elongation and heat distortion.

Results similar to those obtained with compositions AA through NN of Table IX are obtained when the following copolymers are used in place of the polyvinyl chloride of these compositions: copolymers produced from a mixture of 95% vinyl chloride and 5% vinyl acetate, 85% vinyl chloride and 15% vinyl acetate, 80% vinyl chloride and 20% vinylidene chloride, 90% vinyl chloride and 10% methyl acrylate and 80% vinyl chloride and 20% ethyl methacrylate.

While this invention has been described with respect to certain embodiments, it is not so limited and it is to be understood that variations and modifications thereof may be made without departing from the spirit or scope of this invention.

The embodiments of the invention in which an exclusive property or privilege is claimed are defined as follows:

1. A vinyl halide resin composition comprising (a) a vinyl halide polymer selected from the group consisting of polymerized vinyl halide monomers and the copolymers of such monomers with an ethylenically unsaturated monomer, at least 50% of the monomer units of said copolymers being vinyl halide units, (b) a fumarate ester composition selected from the group consisting of
    (1) the reaction product of an ester of maleic acid of the structure

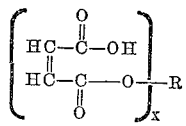

where R is selected from aliphatic and alicyclic hydrocarbon radicals and $x$ is a whole number from 2 to 6 with a hydroxy compound of the structure $R_1OH$, where $R_1$ is selected from alkyl, cycloalkyl, alkenyl and aralkyl radicals; said recation being conducted in the presence of a hydrogen halide;
    (2) the reaction product of a fumarate ester of the formula

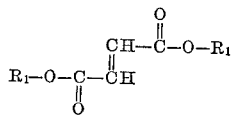

where $R_1$ is selected from alkyl, cycloalkyl, alkenyl and aralkyl radicals; with a hydroxy compound having from 2 to 6 hydroxy groups;
    (3) the reaction product of a fumaryl chloride of the formula

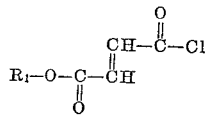

where $R_1$ is selected from alkyl, cycloalkyl, alkenyl and aralkyl radicals, with a hydroxy compound having from 2 to 6 hydroxy groups, and (c) a polyallyl ester of a polybasic acid having up to four carboxy groups, said composition comprising from about 5 to about 200 parts by weight of a mixture of (b) and (c) per 100 parts by weight of (a) and there being at least one part by weight of (b) per part by weight of (c).

2. A vinyl halide resin composition comprising (a) a vinyl halide polymer selected from the group consisting of polymerized vinyl halide monomers and the copolymers of such monomers with an ethylenically unsaturated monomer, at least 50% of the monomer units of said copolymers being vinyl halide units, (b) a fumarate ester composition selected from the group consisting of
    (1) the reaction product of an ester of maleic acid of the structure

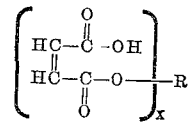

where R is selected from aliphatic and alicyclic hydrocarbon radicals and $x$ is a whole number from 2 to 6 with a hydroxy compound of the structure $R_1OH$, where $R_1$ is selected from alkyl, cycloalkyl, alkenyl and aralkyl radicals, said reaction being conducted in the presence of a hydrogen halide,
    (2) the reaction product of a fumarate ester of the formula

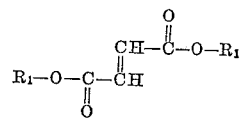

where $R_1$ is selected from alkyl, cycloalkyl, alkenyl and aralkyl radicals, with a hydroxy compound having from 2 to 6 hydroxy groups and
    (3) the reaction product of a fumaryl chloride of the formula

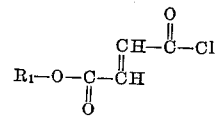

where $R_1$ is selected from alkyl, cycloalkyl, alkenyl and aralkyl radicals with a hydroxy compound having from 2 to 6 hydroxy groups, (c) a polyallyl ester of a polybasic acid having up to 4 carboxy groups and (d) a substantially non-volatile alkyl substituted monoaryl compound containing 14 to 24 carbon atoms characterized by having an alkyl chain length of at least 6 and not more than 18 carbon atoms, the aryl substituent of said alkyl substituted monoaryl compound being an aromatic hydrocarbon radical obtained upon removal of one hydrogen substituent of a ring carbon atom of a member of the benzene series of the structure

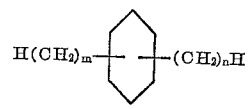

where $m$ and $n$ are integers of 0 to 1; said composition comprising from about 5 to about 200 parts by weight of a mixture of (b), (c) and (d) per 100 parts by weight of (a) and there being at least one part by weight of (b) per part by weight of (c) and at least 3 parts by weight of (b) per two parts by weight of (d).

3. A composition of claim 2 wherein the vinyl halide polymer is a vinyl chloride polymer.

4. A composition of claim 2 wherein the vinyl halide polymer is polyvinyl chloride.

5. A composition of claim 2 wherein the vinyl halide polymer is a copolymer of vinyl chloride and vinyl acetate.

6. A composition of claim 2 comprising from about 25 to about 100 parts by weight of a mixture of (b), (c) and (d) per 100 parts by weight of (a) and there being at least 3 parts by weight of (b) per two parts by weight of (c) and at least 3 parts by weight of (b) per part by weight of (d).

7. A composition of claim 2 wherein the polyallyl ester of a polybasic acid is a diallyl ester of dicarboxylic acid.

8. A composition of claim 7 wherein the diallyl ester of a dicarboxylic acid is diallyl adipate.

9. A composition of claim 7 wherein the diallyl ester of a dicarboxylic acid is diallyl phthalate.

10. A vinyl halide resin composition comprising (a) a vinyl halide polymer selected from the group consisting of polymerized vinyl halide monomers and the copolymers of such monomers with an ethylenically unsaturated monomer, at least 50% of the monomer units of said copolymers being vinyl halide units, (b) the reaction product of an ester of maleic acid of the structure

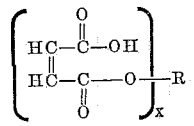

where R is selected from aliphatic and alicyclic hydrocarbon radicals, $x$ is a whole number from 2 to 6, with a hydroxy compound of the structure $R_1OH$, where $R_1$ is selected from alkyl, cycloalkl, alkenyl and aralkyl radicals, said reaction being conducted in the presence of a hydrogen halide and (c) a diallyl ester of a dicarboxylic acid, said composition comprising from about 5 to about 200 parts by weight of a mixture of (b) and (c) per 100 parts by weight of (a), and there being at least one part by weight of (b) per part by weight of (c).

11. A composition of claim 10 wherein R is 1,3-butylene and $R_1$ is isohexyl.

12. A composition of claim 11 wherein $R_1$ is 2-ethylhexyl.

13. A composition of claim 11 wherein R is propoxypropyl and $R_1$ is butyl.

14. A composition of claim 11 wherein the vinyl halide polymer is polyvinyl chloride.

15. A polyvinyl chloride resin composition comprising (a) polyvinyl chloride, (b) the reaction product of an ester of maleic acid of the structure

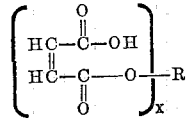

where R is selected from aliphatic and alicyclic hydrocarbon radicals and $x$ is a whole number from 2 to 6, with a hydroxy compound of the structure $R_1OH$, where $R_1$ is selected from alkyl, cycloalkyl, alkenyl and aralkyl radicals, said reaction being conducted in the presence of a hydrogen halide; (c) a diallyl ester of dicarboxylic acid and (d) a substantially non-volatile alkyl substituted monoaryl compound containing 14 to 24 carbon atoms characterized by having an alkyl chain length of at least 6 and not more than 18 carbon atoms, the aryl substituent of said alkyl substituted monoaryl compound being an aromatic hydrocarbon radical obtained upon removal of one hydrogen substituent of a ring carbon atoms of a member of the benzene series of the structure

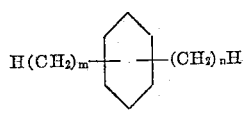

where $m$ and $n$ are integers of 0 to 1, said composition comprising from about 25 to about 100 parts by weight of a mixture of (b), (c) and (d) per 100 parts by weight of polyvinyl chloride and there being at least 3 parts by weight of (b) per two parts by weight of (c) and at least 3 parts by weight of (b) per part by weight of (d).

16. A composition of claim 15 wherein the diallyl ester of a dicarboxylic acid is diallyl adipate.

17. A composition of claim 15 wherein the diallyl ester of a dicarboxylic acid is diallyl phthalate.

18. A composition of claim 15 wherein the substantially non-volatile alkyl substituted monoaryl compound is keryl benzene obtained by condensing in substantially equimolecular proportions benzene and kerosene chloride prepared by introducing chlorine into a paraffinic kerosene fraction until said fraction is substantially one-third to two-thirds chlorinated on a molar basis, said kerosene fraction boiling between 190° C. and 250° C. and consisting essentially of paraffinic hydrocarbons averaging 12 carbon atoms per molecule.

19. A composition of claim 15 wherein the substantially non-volatile alkyl substituted monoaryl compounds is monophenyl dodecane obtained by condensing a branched chain propylene tetramer with benzene.

20. A composition of claim 15 wherein the substantially non-volatile alkyl substituted monoaryl compound is monophenyl pentadecane obtained by condensing a branched chain propylene pentamer with benzene.

21. A composition of claim 15 wherein R is 1,3-butylene and $R_1$ is isohexyl.

22. A vinyl halide resin composition comprising (a) vinyl halide polymer selected from the group consisting of polymerized vinyl halide monomers and the copolymers of such monomers with an ethylenically unsaturated monomer, at least 50% of the monomer units of said copolymers being vinyl halide units, (b) the reaction product of an ester of maleic acid of the structure

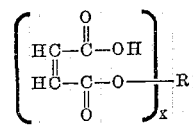

where R is selected from aliphatic and alicyclic hydrocarbon radicals, $x$ is a whole number from 2 to 6, with a hydroxy compound of the structure $R_1OH$, where $R_1$ is selected from alkyl, cycloalkyl, alkenyl and aralkyl radicals, said reaction being conducted in the presence of a hydrogen halide, (c) a polyallyl ester of the polybasic acid having up to four carboxy groups and (d) a material selected from the class consisting of dialkyl phthalates, dialkyl adipates, trialkyl phosphates, triaryl phosphates and epoxidized soya bean oil, said composition comprising from about 5 to about 200 parts by weight of a mixture of (b)+(c)+(d) per 100 parts by weight of (a) there being at least one part by weight of (b) per part by weight of (c) and (d) is present up to an amount of about 35% of the weight of (b)+(c)+(d).

23. A vinyl halide resin composition comprising (a) a vinyl halide polymer selected from the group consisting of polymerized vinyl halide monomers and the copolymers of such monomers with an ethylenically unsaturated monomer, at least 50% of the monomer units of said copolymers being vinyl halide units, (b) the reaction product of a fumaryl chloride of the formula

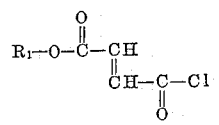

where $R_1$ is selected from the group consisting of alkyl, cycloalkyl, alkenyl, and aralkyl radicals, with a polyhydroxy compound having from 2 to 6 hydroxyl groups, the molar ratio of chloride to polyhydroxy compound being $x:1$ where $x$ equals the number of said hydroxyl groups, (c) a diallyl ester of a dicarboxylic acid and (d) a substantially non-volatile alkyl substituted monoaryl compound containing 14 to 24 carbon atoms characterized by having an alkyl chain length of at least 6 and not more than 18 carbon atoms, the aryl substitutent of said alkyl substituted monoaryl compound being an aromatic hydrocarbon radical obtained upon removal of one hydrogen substituent of a ring carbon atom of a member of the benzene series of the structure

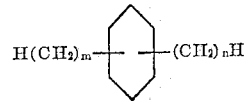

where *m* and *n* are integers of 0 to 1, said composition comprising from about 25 to about 100 parts by weight of a mixture of (b), (c) and (d) per 100 parts by weight of polyvinyl chloride and there being at least 3 parts by weight of (b) per two parts by weight of (c) and at least 3 parts by weight of (b) per part by weight of (d).

24. A vinyl chloride resin composition comprising (a) a vinyl chloride polymer selected from the group consisting of polymerized vinyl chloride monomers and the copolymers of such monomers with an ethylenically unsaturated monomer, at least 50% of the monomer units of said copolymers being vinyl chloride units, (b) the reaction product of a fumaryl chloride of the formula

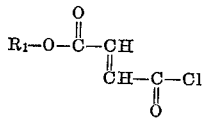

where $R_1$ is selected from the group consisting of alkyl, cycloalkyl, alkenyl and aralkyl radicals, with a polyhydroxy compound having from 2 to 6 hydroxyl groups, the molar ratio of chloride to polyhydroxy compound being $x:1$ where x equals the number of said hydroxyl groups, (c) a diallyl ester of a dicarboxylic acid and (d) a substantially non-volatile alkyl substituted monoaryl compound containing 14 to 24 carbon atoms characterized by having an alkyl chain length of at least 6 and not more than 18 carbon atoms, the aryl substituent of said alkyl substituted monoaryl compound being an aromatic hydrocarbon radical obtained upon removal of one hydrogen substituent of a ring carbon atom of a member of the benzene series of the structure

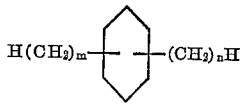

where *m* and *n* are integers of 0 to 1, said composition comprising from about 25 to about 100 parts by weight of a mixture of (b), (c) and (d) per 100 parts by weight of polyvinyl chloride and there being at least 3 parts by weight of (b) per 2 parts by weight of (c) and at least 3 parts by weight of (b) per part by weight of (d).

25. A composition of claim 24 wherein the polymer is a vinyl chloride-vinyl acetate copolymer.

26. A polyvinyl chloride resin composition comprising (a) polyvinyl chloride, (b) the reaction product of a fumaryl chloride of the formula

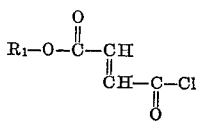

where $R_1$ is selected from the group consisting of alkyl, cycloalkyl, alkenyl and aralkyl radicals, with a polyhydroxy compound having from 2 to 6 hydroxyl groups, the molar ratio of chloride to polyhydroxy compound being $x:1$ where x equals the number of said hydroxyl groups, (c) a diallyl ester of a dicarboxylic acid and (d) a substantially non-volatile alkyl substituted monoaryl compound being an aromatic hydrocarbon radical obtained upon removal of one hydrogen substituent of a ring carbon atom of a member of the benzene series of the structure

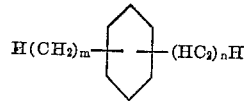

where *m* and *n* are integers of 0 and 1, said composition comprising from about 25 to about 100 parts by weight of a mixture of (b), (c) and (d) per 100 parts by weight of polyvinyl chloride and there being at least 3 parts by weight of (b) per 2 parts by weight of (c) and at least 3 parts by weight of (b) per part by weight of (d).

27. A composition of claim 26 comprising (a) polyvinyl chloride, (b) the reaction product of n-butyl fumaryl chloride and 1,2,6-hexanetriol, (c) diallyl adipate and (d) monophenyl dodecane.

28. A polyvinyl chloride resin composition of claim 26 comprising (a) polyvinyl chloride, (b) the reaction product of isohexyl fumaryl chloride and 1,3-butanediol, (c) diallyl adipate and (d) monophenyl dodecane.

29. An additive formulation consisting essentially of (a) from about 50 to 90 parts by weight of the reaction product of a fumaryl chloride of the formula

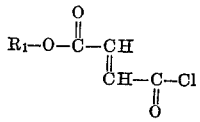

where $R_1$ is selected from the group consisting of alkyl, cycloalkyl, alkenyl and aralkyl radicals, with a polyhydroxy compound having from 2 to 6 hydroxyl groups, the molar ratio of chloride to polyhydroxy compound being $x:1$ where $x$ equals the number of said hydroxyl groups, (b) from about 5 to 50 parts by weight of a diallyl ester of a dicarboxylic acid and (c) from about 5 to 30 parts by weight of a monophenyl alkane obtained by condensing a branched chain propylene polymer containing 9 to 18 carbon atoms with benzene.

References Cited

UNITED STATES PATENTS

| | | | |
|---|---|---|---|
| 2,155,591 | 4/1939 | Garvey | 260—884 |
| 2,647,098 | 7/1953 | Smith et al. | 260—31.6 |
| 2,744,877 | 5/1956 | Smith | 260—31.6 |
| 2,862,959 | 12/1958 | Patrick et al. | 260—31.8 |
| 2,885,378 | 5/1959 | Darby. | |
| 3,046,237 | 7/1962 | Rosenfelder et al. | 260—31.4 |
| 3,060,148 | 10/1962 | Evans et al. | 260—31.4 |

MORRIS LIEBMAN, *Primary Examiner.*

L. T. JACOBS, *Assistant Examiner.*